United States Patent [19]
Takeuchi et al.

[11] Patent Number: 5,545,497
[45] Date of Patent: Aug. 13, 1996

[54] CATHODE MATERIAL FOR NONAQUEOUS ELECTROCHEMICAL CELLS

[75] Inventors: Esther S. Takeuchi, East Amherst; Randolph A. Leising, Williamsville, both of N.Y.

[73] Assignee: Wilson Greatbatch Ltd., Clarence, N.Y.

[21] Appl. No.: 263,130

[22] Filed: Jun. 21, 1994

[51] Int. Cl.$^6$ ............................................. H01M 4/54
[52] U.S. Cl. .................. 429/219; 429/194; 429/217; 429/232
[58] Field of Search ................................. 429/217, 218, 429/219, 232, 194; 29/623.1; 264/112, 272.15, 272.21, 294, 165; 156/242

[56] References Cited

U.S. PATENT DOCUMENTS

| | | | |
|---|---|---|---|
| 4,310,609 | 1/1982 | Liang et al. | 429/194 |
| 4,830,940 | 5/1989 | Keister et al. | 429/194 |
| 5,180,642 | 1/1993 | Weiss et al. | 429/90 |
| 5,389,472 | 2/1995 | Takeuchi et al. | 429/219 |

*Primary Examiner*—Kathryn Gorgos
*Attorney, Agent, or Firm*—Hodgson, Russ, Andrews, Woods & Goodyear LLP

[57] ABSTRACT

A new cathode material for use in a high energy density electrochemical cell, preferably comprising silver and vanadium, is described. The new cathode material has the general formula $Ag_xV_2O_y$ and can comprise a β-phase silver vanadium oxide having in the general formula $x=0.35$ and $y=5.18$ and a γ-phase silver vanadium oxide having in the general formula $x=0.74$ and $y=5.37$ or a mixture of the phases. This new cathode material exhibits reduced voltage delay during high rate applications, such as when the cathode mixture is incorporated into a primary lithium electrochemical cell powering an implantable cardiac defibrillator.

46 Claims, 4 Drawing Sheets

CATHODE MATERIAL FOR NONAQUEOUS ELECTROCHEMICAL CELLS

BACKGROUND OF THE INVENTION

1. Field of the Invention

The present invention relates to the art of electrochemical cells. More particularly, the present invention relates to a new cathode material for use in a high energy density electrochemical cell, preferably comprising silver and vanadium. The new cathode material has the general formula $Ag_xV_2O_y$ and can comprise a β-phase silver vanadium oxide having in the general formula x=0.35 and y=5.18 and a γ-phase silver vanadium oxide having in the general formula x=0.74 and y=5.37 or a mixture of the phases. This new cathode material exhibits reduced voltage delay during high rate applications, such as when the cathode mixture is incorporated into a primary lithium electrochemical cell powering an implantable cardiac defibrillator.

2. Prior Art

Mixed metal oxides such as silver vanadium oxide are known for use as a cathode active material in an electrochemical cell. Keister et al. U.S. Pat. No. 4,830,940, which is assigned to the assignee of the present invention and is incorporated herein by reference, describes a nonaqueous lithium electrochemical cell comprising a silver vanadium oxide cathode material having the general formula $Ag_xV_2O_y$ wherein "x" is in the range from about 0.5 to about 2.0, preferably from about 0.95 to about 1.1 and "y" is in the range from about 4.5 to about 6.0, preferably from about 5.0 to about 6.0. This mixed metal oxide material includes the γ-phase silver vanadium oxide having the stoichiometric formula $Ag_{0.74}V_2O_{5.37}$. However, Keister et al. does not disclose the β-phase silver vanadium oxide. There is also no suggestion of a mixture of the β- and γ-phases of the cathode active material having x<0.5. Finally, this patent does not address the problem of providing a cathode active material having a reduced voltage delay.

Weiss et al. U.S. Pat. No. 5,180,642 provides a cathode comprising manganese dioxide ($MnO_2$), carbon monofluoride ($CF_x$) or a mixture of the two and a cathode additive, such as silver vanadate having the formula $β-Ag_xV_2O_5$, $δAg_xV_2O_5$ or $Ag_2V_4O_{11}$ incorporated into the cathode mixture. The stoichiometric value of "x" is not further defined and there is no mention of the use of a mixture of the β- and γ-phases of the cathode active material. Also, Weiss et al. was not concerned with reduced voltage delay during high rate applications, but rather, the cathode additive serves as an end-of-service indicator.

SUMMARY OF THE INVENTION

An electrochemical cell is provided having a metallic anode comprising a Group IA, IIA or IIIB element or alloy thereof, a solid cathode of electronically conductive material and an ionically conductive, nonaqueous electrolytic solution operatively associated and in direct contact with the anode and the cathode. More preferably, the metallic anode comprises lithium metal, the solid cathode comprises a mixed metal oxide, such as silver vanadium oxide and the nonaqueous electrolytic solution comprises at least one ion-forming alkali metal salt and an organic solvent. The silver vanadium oxide cathode active material preferably has the general formula $Ag_xV_2O_y$, wherein $0.33 \leq x \leq 0.99$ and $5.16 \leq y \leq 5.49$.

Cathode plates can be formed by an entirely dry pressing procedure thereby enhancing the shelf life of the resulting plates. Alternatively, the procedure can include the dropwise addition of liquid electrolyte to the cathode mixture prior to pressing to enhance the performance and discharge rate capability of an assembled cell incorporating the cathode. The discharge characteristics of an electrochemical cell having the cathode comprising the mixture of the β- and γ-phases of silver vanadium oxide of the present invention has a gradually sloping discharge characteristic.

These and other features and advantages of the present invention will become increasingly more apparent to those skilled in the art by reference to the following description.

DETAILED DESCRIPTION OF THE INVENTION

Figure 1:
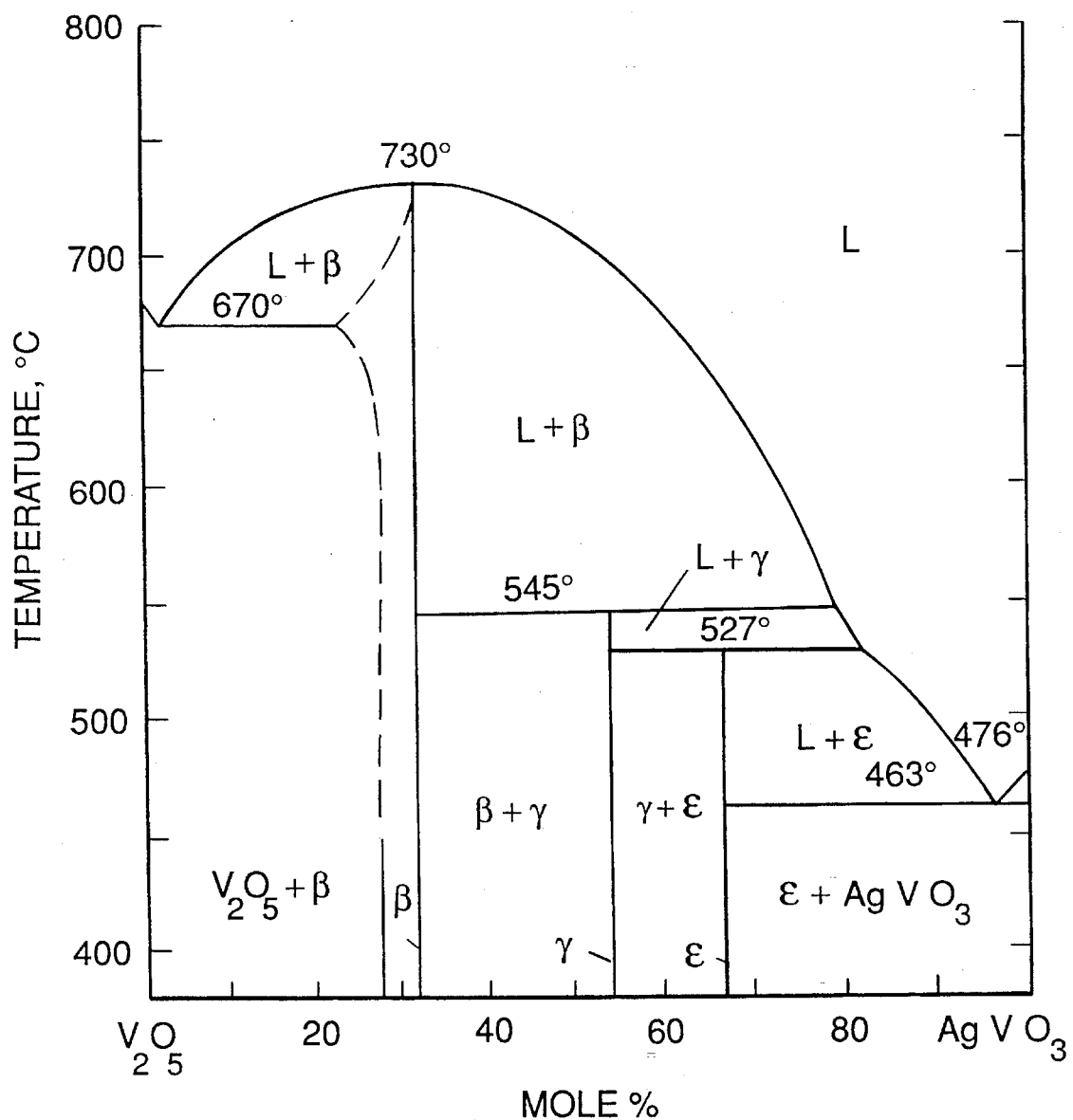
FIG. 1 is a phase diagram for silver vanadium oxide.

The cell of the present invention comprises an anode selected from Groups IA, IIA or IIIB metals, and their alloys. The preferred anode comprises lithium which may be present in the cell in many forms. Preferably, the anode is a thin sheet or foil of the anode metal, pressed or rolled on a metallic anode current collector to form an anode strip. In the cell of the present invention, the anode strip has an extended tab or lead of the same material as the current collector or integrally formed therewith such as by welding to the current collector and contacted by a weld to a cell case of conductive metal in a case-negative electrical configuration. Alternatively, the anode may be formed of some other geometric shape, such as a bobbin shape, cylinder or pellet to allow an alternate low surface area cell design.

The cell of the present invention further comprises a solid cathode of an electronically conductive composite material which serves as the other electrode of the cell. The solid cathode material comprises a mixed metal oxide preferably formed by the thermal treatment of starting materials in a thermal decomposition reaction, a chemical addition reaction including chemical vapor deposition or hydrothermal synthesis in mixed states, or otherwise intimate contact of various metal oxides-metal oxides or metal oxide/elemental metal combinations. The materials thereby produced contain metals and oxides of Groups IB, IIB, IIIB, IVB, VB and VIB, VIIB and VIII which includes the noble metals and/or their oxide compounds.

In one aspect of the present invention, readily decomposable compounds consisting of metals from Groups IB, IIB, IIIB, IVB, VB, VIB and VIIB as well as similarly decomposable compounds from Group VIII are thermally treated so as to effect the rapid preparation of the oxides or the respective metal elements themselves to be utilized further in the preparation of suitable cathode materials. Such readily decomposable materials include, but are not limited to, those classes of compounds known as nitrates, nitrites, carbonates and/or ammonium salts. These precursor materials (i.e., nitrates, nitrites, carbonates, ammonium compounds, etc.) may be decomposed in a combined state or individually decomposed and thereafter combined in an oxide-decomposable metal salt compound and subsequently decomposed to form the mixed metal oxide cathode active material.

In a preferred form of the decomposition preparation of the cathode materials of the present invention, a thermally decomposable salt of silver is thermally decomposed with vanadium pentoxide at a temperature of between about 350° C. to 550° C. in an oxidizing atmosphere. The resulting cathode active material comprises silver vanadium oxide as a mixed metal oxide having the general formula $Ag_xV_2O_y$.

In particular, synthesis of silver vanadium oxide by the decomposition method is typically carried out by first thermally decomposing a vanadium salt, such as ammonium metavanadate, to produce vanadium pentoxide. A decomposable metal salt, preferably containing silver, is then blended with the vanadium pentoxide and the mixture is oven-dried. Following drying, the mixture is again blended and ground to ensure thorough intermingling of the constituents and the resulting homogeneous mixture is heated in an oxidizing atmosphere for a final heating/decomposition period.

One form of the mixed metal oxide made by the thermal decomposition reaction comprises a β-phase silver vanadium oxide wherein in the general formula of $Ag_xV_2O_y$, x=0.35 and y=5.18. Another form of the mixed metal oxide comprises a γ-phase silver vanadium oxide wherein in the general formula, x=0.74 and y=5.37. Still another form of the mixed metal oxide comprises a mixture of the β- and γ-phases of silver vanadium oxide. The mixture of the mixed metal oxide phases is preferably synthesized at a relatively lower temperature of about 375° C. than the pure β- and γ-phase silver vanadium oxides, which are preferably synthesized at about 450° C. The mixture of the β- and γ-phases of silver vanadium oxide as indicated in the phase diagram shown in FIG. 1 is made from silver vanadate present in about a 46% to 68% mole ratio combined with vanadium pentoxide present in about a 32% to 54% mole ratio and prepared during a thermal treatment, such as the thermal decomposition reaction previously described, at between about 375° C. to 545° C., preferably at about 375° C. in an oxidizing atmosphere, such as air. The range of material composition used for the β- and γ-phases of silver vanadium oxide has in the general formula $0.33 \leq x \leq 0.99$ and $5.16 \leq y \leq 5.49$. The phase diagram shown in FIG. 1 is reproduced from Volkov, V. L.; Fotiev, A. A.; Sharova, N. G.; Surat, L. L. "Russ. J. Inorg. Chem.", 21: 1566–1567, 1976.

A typical form of the mixture of the phases of silver vanadium oxide, i.e. a mixture of the β- and γ-phases of silver vanadium oxide, has the stoichiometric formula $Ag_{0.67}V_2O_{5.3}$ and is characterized by an exothermic transition at 549° C. in the differential scanning calorimetry data and d-spacings of 6.74, 5.20, 3.87, 3.38, 3.15, 3.01, 2.94, 2.88, 2.63, 2.52, 2.29, 1.78, 1.71 and 1.54 in the X-ray powder diffraction pattern for the mixture. The cathode mixture of the β- and γ-phases of silver vanadium oxide also displays a characteristic sloping voltage versus time curve for the discharge of a lithium/silver vanadium oxide cell (FIG. 2), prepared as described in detail presently. The sloping discharge curve 10 for such a cell is of particular importance for batteries in implantable medical applications where a state of charge or expanded battery capacity is able to be monitored and end-of-life of the battery to be predicted. This obviously is advantageous in an implanted device such as a defibrillator.

The present invention also provides for preparation of silver vanadium oxide by the chemical addition reaction of a silver-containing component intimately combined with a vanadium-containing compound to form the β- and γ-phase of the mixed metal oxide. The addition reaction results in the intercalation of silver ions into starting materials comprising one or more vanadium-containing compounds through intimate contact of the silver-containing component with the vanadium-containing compound. The silver-containing component may include silver oxide, silver iodide, a silver vanadate, silver metal, silver carbonate, or a combination thereof. The vanadium-containing compound may include silver vanadate, vanadium oxide salt and vanadium oxides with the latter being preferred. One such method of the present invention comprises intimately combining elemental silver, Ag(0), with vanadium pentoxide, $V_2O_5$, in about a 1:1 mole ratio by thoroughly grinding the starting materials together to ensure homogeneity followed by the thermal treatment in an inert atmosphere of the resulting mixed metal oxide to produce an oxygen deficient silver vanadium oxide product.

Another example of a chemical addition reaction according to the present invention comprises synthesizing silver vanadium oxide from starting materials including a metal salt, preferably silver vanadate ($AgVO_3$), and vanadium pentoxide ($V_2O_5$). This method comprises intimately combining the starting materials by thoroughly grinding them together to ensure homogeneity, thermally treating the ground mixture, additional combining by further grinding followed by a final thermal treatment of the silver vanadium oxide mixture. The use of silver vanadate as the silver material avoids the liberation of toxic fumes generated by use of silver nitrate, as in the previously discussed thermal decomposition method.

Still another method of the present invention comprises preparing silver vanadium oxide utilizing sol-gel technology. This method comprises intercalating silver cations into an acidified vanadium oxide gel followed by thermally treating and thereby dehydrating the silver vanadium oxide mixture. Alternately, a thin coating of the resultant cathode active material may be applied, such as via a spray coating technique, to an appropriate substrate material in the formation of a cathode.

The intercalation of silver cations involves proton-exchange reactions with acidic protons contained within the $V_2O_5$ gels. Thermal treatment of the silver vanadium oxide mixture serves in part to remove water from the mixture. During the dehydration process, OH bond breaking occurs which, along with the intercalated cations, plays an important role in the evolution of the structural orientation of the resultant crystalline compound. Thus, the electrical charge and the properties of the silver vanadium oxide, produced by utilizing sol-gel technology, is influenced by parameters which include the following: the amount of reduced vanadium ions (state of reduction); the extent of intercalation of silver cations (exchange cation content); and the water content remaining after dehydration (the hydration state).

Controlled alteration of one or more of these parameters may lead to the formation of mixed metal oxide compositions, comprising silver vanadium oxides, with differences in structural orientation or anisotropic character which can give rise to variations in properties such as electrical conductivity.

These addition reactions may be carried out at temperatures of from between about 300° C. to 700° C., preferably at temperatures of between about 350° C. to 550° C. and may proceed to completion within about 2 to 22 hours. Lower temperatures require a longer reaction time. Longer reaction times and higher temperatures may lead to diminished rate capability in the cells utilizing the silver vanadium oxide material due to undesirable grain growth. Therefore, in general, lower temperatures are preferred in order to limit grain growth in the silver vanadium oxide product. The addition reactions are preferably carried out in an oxidizing atmosphere including for example air or oxygen.

Yet another method of the present invention comprises synthesizing an amorphous silver vanadium oxide from silver oxide intimately combined with the vanadium-containing compound. This addition reaction is carried out by thoroughly grinding the starting materials together, thermally treating the combined starting materials and rendering the mixture amorphous by rapid cooling. Preferably, a non-metallic oxide salt, and more preferably a phosphorous oxide salt such as $P_2O_5$, is added to the starting ingredients as a dopant to enhance the breakdown of the crystalline mixtures to render the product amorphous. The thermal treatment is preferably carried out at between about 750° C. to 775° C., more preferably at about 760° C., for about one to two hours. Following thermal treatment, the mixed metal oxide is rapidly cooled to yield silver vanadium oxide in an amorphous state. A crystalline silver vanadium oxide is formed by thermally treating the silver-containing compound combined with the vanadium-containing compound and then slowly cooling the resulting combination. The crystalline product also does not require the use of a dopant.

Alternatively, the vanadium-containing oxide compound can be rendered amorphous prior to being intimately combined with the silver containing-compound in an addition reaction. In this case, the dopant material is added to the vanadium-containing compound to retard formations of crystalline structure before the vanadium-containing compound is rendered amorphous by heating to between about 750° C. to 775° C., preferably about 760° C. for about one to two hours, followed by rapid cooling. The amorphous vanadium-containing compound is finally combined with the silver-containing compound in an addition reaction to form the product.

The mixed metal oxide cathode active material comprising the β-phase silver vanadium oxide, the γ-phase silver vanadium oxide and the mixture of the β- and γ-phases may be pressed into a cathode pellet with the aid of a suitable binder material, preferably a powder fluororesin, such as polytetrafluoroethylene powder and a material having electronic conductive characteristics, such as carbon black and graphite. In some cases, no binder material or electronic conductor material is required to provide a similarly suitable cathode body. Further, some of the cathode matrix material may be prepared by rolling, spreading or pressing a mixture of the materials mentioned above onto a suitable current collector such as Exmet wire mesh. The prepared cathode bodies may be used as either a solid cathode prepared by directly pressing the material into a cell can assembly or a spirally wound cathode structure similar to a "jellyroll."

The cathode active material of the present invention is separated from the anode material by a suitable separator to provide physical separation between the anode and the cathode electrodes. The separator material also must be chemically unreactive with the materials of the anode and cathode electrodes and both chemically unreactive with and insoluble in the electrolytic solution. In addition, the separator material must have a degree of porosity sufficient to allow flow therethrough of the electrolytic solution during the electrochemical reaction of the cell. Illustrative separator materials include non-woven glass, polypropylene, polyethylene, glass fiber material, ceramics and materials commercially available under the designations ZITEX (Chemplast Inc.), CELGARD (Celanese Plastic Company Inc.) and DEXIGLAS (C. H. Dexter, Div. Dexter Corp.). The form of the separator typically is a sheet which is placed between the anode and cathode of the cell in a manner preventing physical contact between the anode and cathode, and such contact also is prevented when the combination is rolled or otherwise formed into a cylindrical configuration.

The electrochemical cell of the present invention further includes a nonaqueous, ionically conductive electrolytic solution operatively associated with the anode and the cathode and comprising at least one ion-forming alkali metal salt dissolved in a suitable solvent. The electrolytic solution serves as a medium for migration of ions between the anode and the cathode during the electrochemical reactions of the cell. The alkali metal salt is selected from Groups IA, IIA or IIIB metals and preferably comprises a similar metal as that comprising the anode. Thus, in the case of a lithium anode, the alkali metal salt of the nonaqueous electrolytic solution may be chosen from, for example, lithium halides, such as LiCl and LiBr, and lithium salts of the $LiMX_n$ type, such as $LiAlCl_4$, $Li_2Al_2Cl_6O$, $LiClO_4$, $LiAsF_6$, $LiSbF_6$, $LiSbCl_6$, $Li_2TiCl_6$, $Li_2SeCl_6$, $Li_2B_{10}Cl_{10}$, $Li_2B_{10}Cl_{12}$, and others. Alternatively, the corresponding sodium or potassium salts may be used.

The nonaqueous solvents suitable for the invention are chosen so as to exhibit those physical properties necessary for ionic transport (low viscosity, low surface tension, and wettability). The nonaqueous solvent of the electrolyte may be any one or more of the organic solvents which are substantially inert to the anode and cathode electrode materials, such as tetrahydrofuran, propylene carbonate, methyl acetate, diglyme, triglyme, tetraglyme, acetonitrile, dimethyl sulfoxide, dimethyl formamide, dimethyl acetamide, 1,2-dimethoxyethane and others. A preferred solvent comprises a 50/50 mixture (by volume) of dimethoxyethane and propylene carbonate (DME/PC).

The nonaqueous solvent also may be one or a mixture of more than one of the inorganic solvents which can serve as both a solvent and a depolarizer, such as thionyl chloride, sulfuryl chloride, selenium oxychloride, chromyl chloride, phosphoryl chloride, phosphorous sulfur trichloride, and others.

The assembly of the cell described herein is preferably in the form of a wound element cell. That is, the fabricated cathode, anode and separator are wound together in a "jellyroll" end type configuration or "wound element cell stack" such that the anode is on the outside of the roll to make electrical contact with the cell case. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass to metal seal/ terminal pin feedthrough and a hole for electrolyte filling. The glass used is a corrosion resistant type having from about 0% to about 50% by weight silicon such as CABAL 12, TA 23 or FUSITE 425 or 435. The positive terminal pin feedthrough preferably comprises molybdenum, titanium, nickel alloy, or stainless steel material. The cell header comprises elements having compatibility with the other components of the electrochemical cell and is for resistance to corrosion. The cathode lead is welded to the positive terminal pin in the glass to metal seal and the header is welded to the case containing the electrode stack. The cell is thereafter filled with the electrolytic solution described hereinabove and hermetically sealed such as by close-welding a stainless steel ball over the fill hole, but not limited thereto. This above assembly describes a case negative cell which is the preferred construction of the cell of the present invention.

The electrochemical cell of the present invention operates in the following manner. When the ionically conductive electrolytic solution of the present invention becomes operatively associated with the anode and the cathode of the cell, an electrical potential differential is developed between terminals operatively connected to the anode and the cathode. The electrochemical reaction at the anode includes oxidation to form metal ions during discharge of the cell. The electrochemical reaction at the cathode involves conversion of ions which migrate from the anode to the cathode into atomic or molecular forms. It is observed that the systems of this invention have a wide operating temperature range, of between about −55° C. to about +225° C.

The electrochemical cell according to the present invention is illustrated further by the following Examples, which are given to enable those skilled in the art to more clearly understand and practice the present invention. The Examples should not be considered as a limitation of the scope of the invention, but are described as being illustrative and representative thereof.

EXAMPLE I

The ability of the mixture of the $\beta$- and $\gamma$-phases of silver vanadium oxide to intercalate lithium was tested in a plurality of Li/SVO cells having a nonaqueous electrolytic solution. Each of the experimental cells utilized a cathode in the form of a pellet (1.4×3.6×0.06 cm) consisting of an admixture having about 94% of the mixture of the $\beta$- and $\gamma$-phases of silver vanadium oxide (by weight) having the stoichiometric formula $Ag_{0.67}V_2O_{5.3}$ along with 3% polytetrafluoroethylene powder, 2% graphite, and 1% carbon black, pressed at 31 ton pressure onto an expanded metal current collector. The cathode was separated from the lithium anode by a polypropylene separator. Lithium metal (1.4×3.6×0.08 cm), also in contact with an expanded metal current collector, was placed against the separator facing the cathode. Both electrodes were surrounded by glass plates and held together by small metal clamps. The cells were placed in a glass enclosure and filled with 1M $LiAsF_6$ in PC/DME electrolyte. The test cells were discharged at a constant resistance (200 Ω) down to a voltage of +2.0 V vs Li/Li+, corresponding to the intercalation of Li+ into the cathode material. The voltage profile of the experimental cells was monitored as a function of time, and curve 10 in FIG. 2 represents a typical plot from one of these experimental cells.

Figure 2:
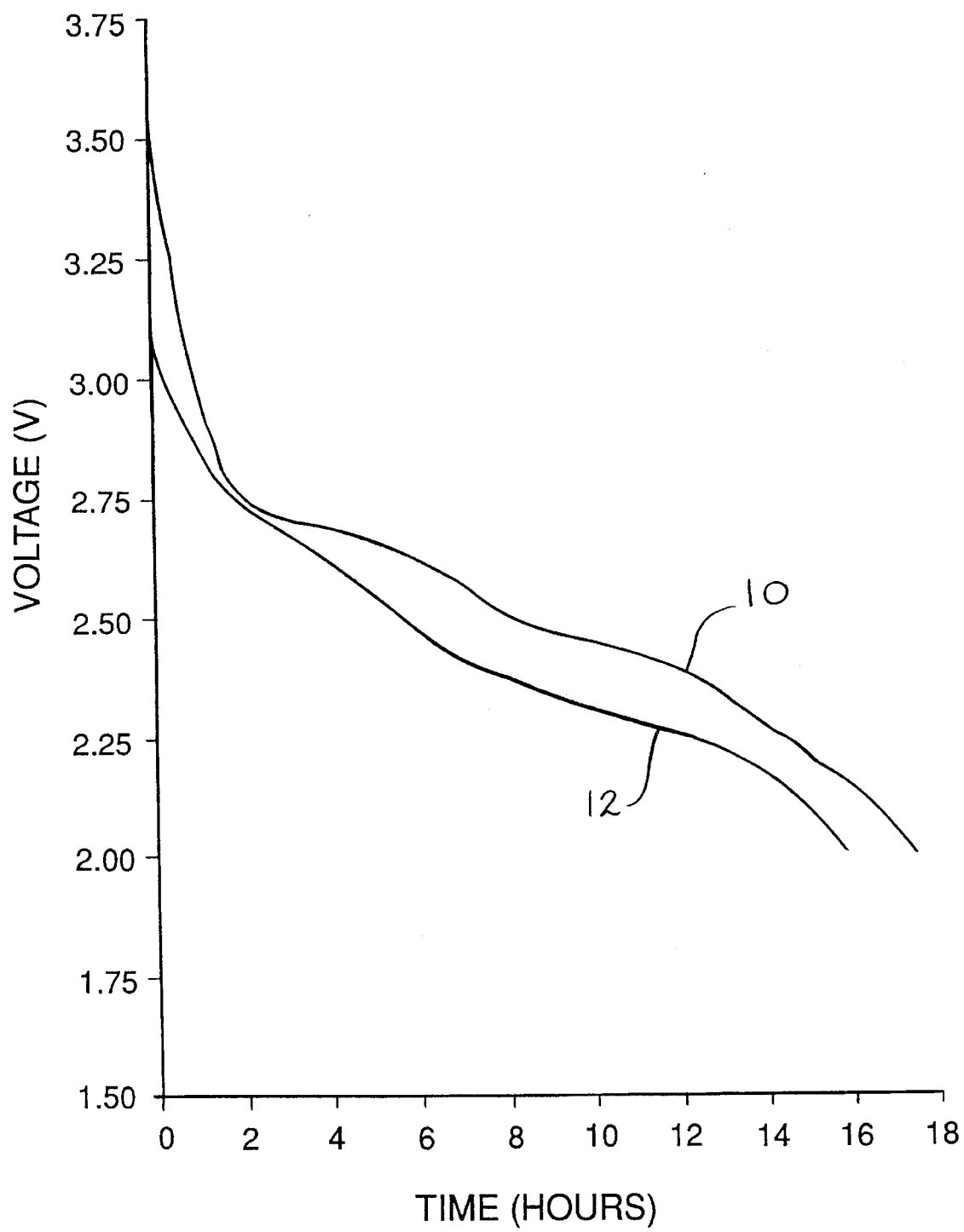
FIG. 2 is a graph showing the discharge curves of an electrochemical cell containing a mixture of β- and γ-phases of silver vanadium oxide as a cathode material in comparison to a cell containing ε-phase, $AgV_2O_{5.5}$, silver vanadium oxide cathode material.

For comparison, a similarly constructed cell containing $\epsilon$-phase silver vanadium oxide having the stoichiometric formula $AgV_2O_{5.5}$ as the cathode active material was discharged under identical conditions and the voltage curve 12 is also shown in FIG. 2. The cells containing the mixture of the $\beta$- and $\gamma$-phases of silver vanadium oxide displayed comparatively higher capacities than the cell containing $\epsilon$-phase silver vanadium oxide cathode active material, the cells containing the phase mixture as the cathode active material having an average value of 280 Ah/kg or 705 Wh/kg upon discharge to +2.0 V. This represents an increase in delivered capacity on a per weight basis over that found for $\epsilon$-phase SVO, which gave 255 Ah/kg or 630 Wh/kg under the same conditions.

EXAMPLE II

The $\beta$- and $\gamma$-phases of silver vanadium oxide were synthesized independently as pure materials and each was utilized as the cathode active material in a multi-plate configuration provided in a hermetic casing. In that respect, the cells had a lithium anode coupled with the respective $\beta$- and $\gamma$-phases of silver vanadium oxide as the cathode active material and the cells were activated with 1M $LiAsF_6$ PC/DME electrolyte. The discharge capacity for these cells was compared to a control cell similarly constructed, but containing $\epsilon$-phase silver vanadium oxide ($AgV_2O_{5.5}$) cathode active material. The various pulse discharge results are summarized in Table I.

TABLE I

| Cathode Material | Capacity (mAh) | | |
| --- | --- | --- | --- |
| | To + 2.0 V | To + 1.7 V | To + 1.5 V |
| $\beta$-phase SVO ($Ag_{0.35}V_2O_{5.18}$) | 951 | 1338 | 1516 |
| SVO ($AgV_2O_{5.5}$) | 1383 | 1552 | 1615 |
| $\beta$-/$\gamma$-phase SVO ($Ag_{0.67}V_2O_{5.33}$) | 1426 | 1569 | 1618 |
| $\gamma$-phase SVO ($Ag_{0.74}V_2O_{5.37}$) | 1505 | 1648 | 1698 |
| SVO ($AgV_2O_{5.5}$) | 1366 | 1610 | 1680 |

EXAMPLE III

A plurality of hermetically-sealed Li/SVO cells were then subjected to pulse testing. The cells contained about 4.0 grams of the mixture of $\beta$- and $\gamma$-phases of silver vanadium oxide having the stoichiometric formula $Ag_{0.67}V_2O_{5.3}$ as the cathode active material and were subjected to constant current pulses of 1.3 Amps. The pulse testing was carried out on each of the cells by subjecting them to four groups of current pulses every 2 months during discharge of the cells with a constant resistance (32.4 kΩ) background load at 37° C. Accordingly, in FIG. 3, curve 20 was recorded with the 32.4 kΩ background load, curve 22 was constructed from the minima of the first pulse of each train and curve 24 was constructed from the minima of the fourth pulse of each train. In comparison, FIG. 4 shows the discharge curves of cells having the $\epsilon$-phase silver vanadium oxide wherein curve 30 was recorded with the 32.4 kΩ background load, curve 32 was constructed from the minima of the first pulse of each train and curve 34 was constructed from the minima of the fourth pulse of each train.

Figure 3:
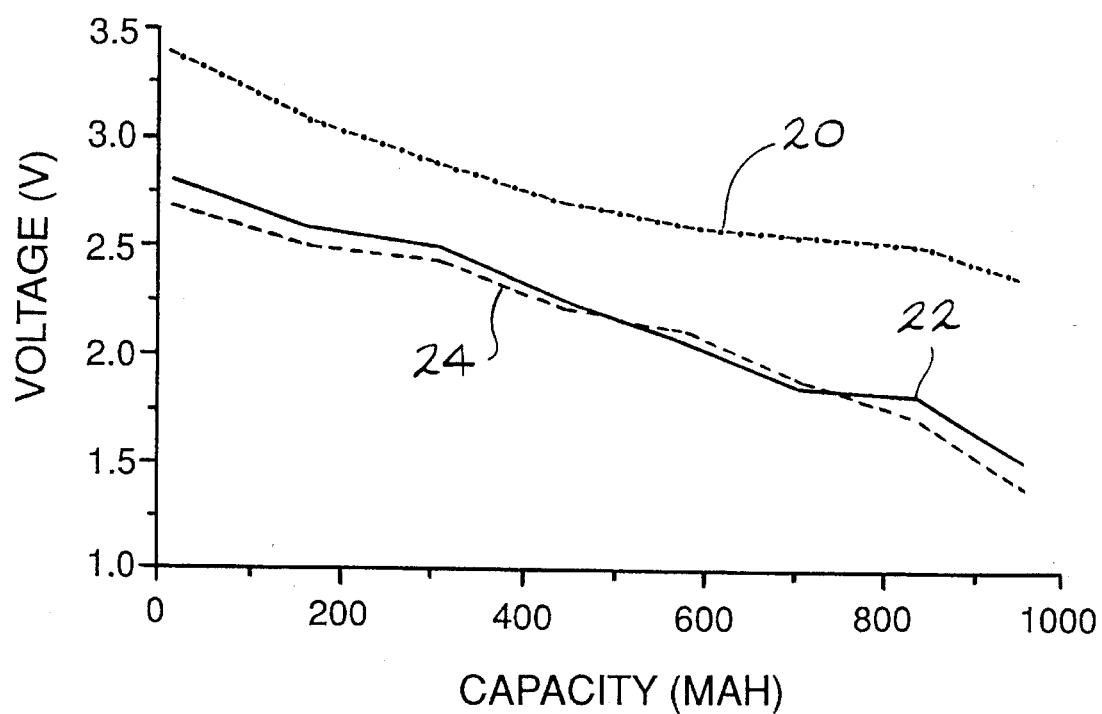
FIG. 3 is a graph showing the discharge curves of an electrochemical cell containing a mixture of β- and γ-phases of the silver vanadium oxide cathode material under pulse testing conditions.
Figure 4:
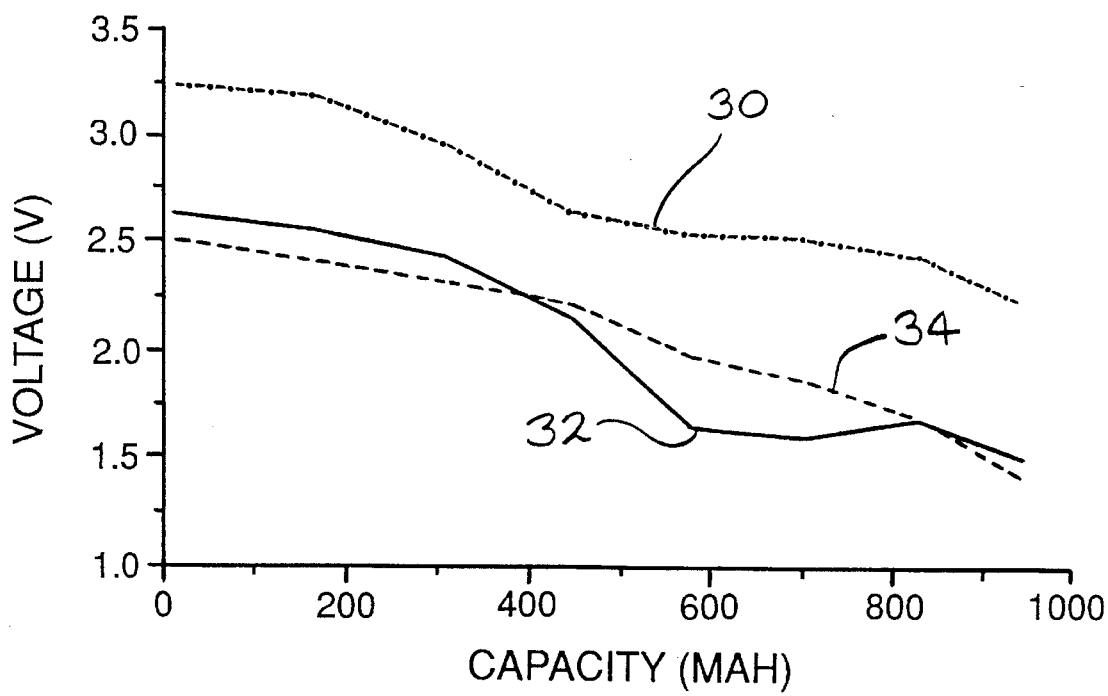
FIG. 4 is a graph showing the discharge curves of an electrochemical cell containing ε-phase silver vanadium oxide cathode material under pulse testing conditions.

The voltage drop upon application of the first current pulse (P1min voltage) indicated at 22 in FIG. 3 and at 32 in FIG. 4 is termed voltage delay. Voltage delay for the cells containing $\epsilon$-phase SVO is much larger than for the cells containing the mixture of the $\beta$- and $\gamma$-phases of silver vanadium oxide. In fact, the cells having the mixture of the β- and γ-phases of silver vanadium oxide demonstrated substantially decreased voltage delay in the capacity range of 450 to 800 mAh as compared to cells employing ε-phase SVO. Lower pulse voltages caused by voltage delay, even if only temporary, are undesirable since voltage delay can cause circuit failure in device applications, and ultimately result in shorter device life.

Figure 5:
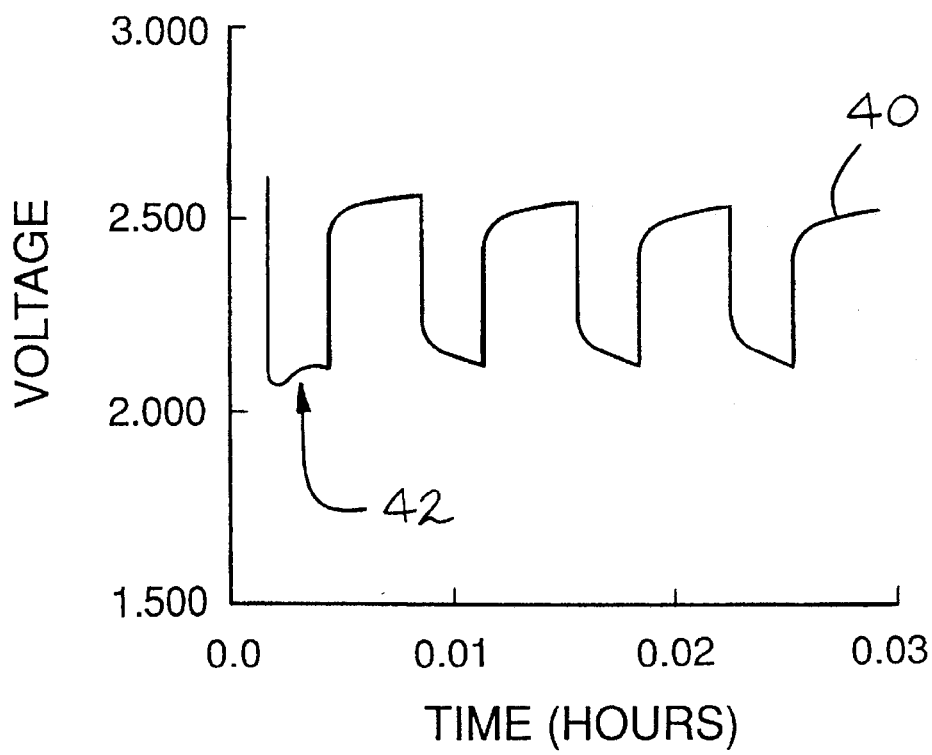
FIG. 5 is a graph showing the pulse voltages versus time curve of an electrochemical cell containing a mixture of β- and γ-phases of the silver vanadium oxide cathode material.
Figure 6:
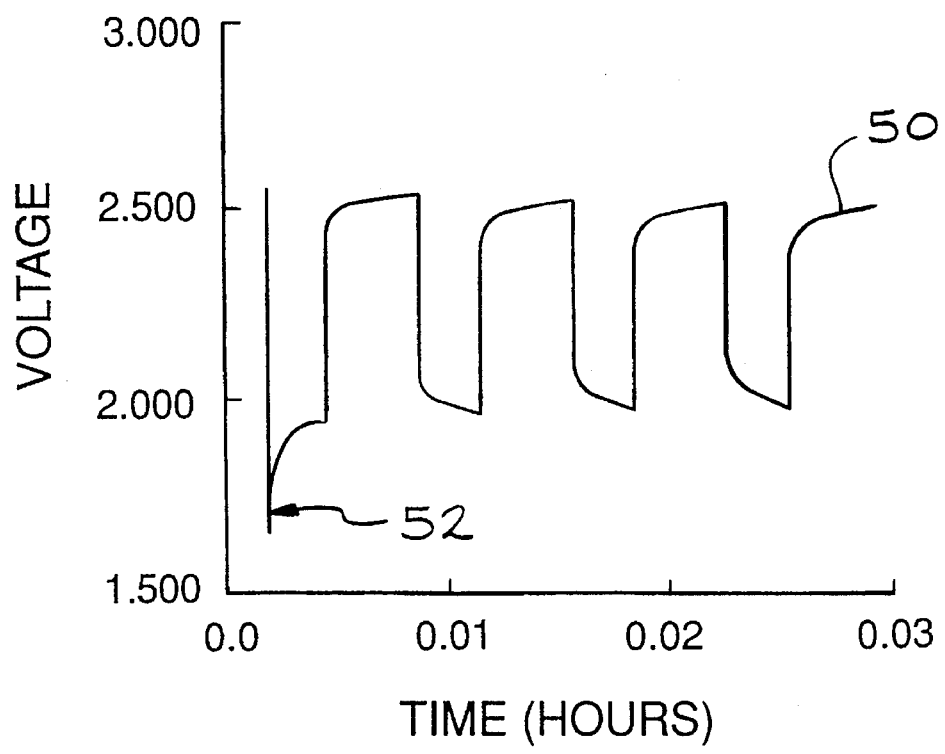
FIG. 6 is a graph showing the pulse voltages versus time curve of an electrochemical cell containing ε-phase silver vanadium oxide cathode material.

The pulse voltages versus time for the cells having the cathode material comprising the mixture of the β- and γ-phases of silver vanadium oxide is indicated as curve 40 in FIG. 5 and the pulse voltages versus time for the cells having cathode material comprising the ε-phase of silver vanadium oxide is indicated as curve 50 in FIG. 6. The desirable decrease in voltage delay found for cells having the mixture of the β- and γ-phases of silver vanadium oxide was a new and unexpected result.

It is intended that the foregoing description and examples be only representative of the present invention and that the present invention be only limited by the hereinafter appended claims.

What is claimed is:

1. A nonaqueous electrochemical cell, which comprises:
   a) an alkali metal anode;
   b) a liquid nonaqueous electrolyte; and
   c) a cathode component comprising silver vanadium oxide of the general formula $Ag_xV_2O_y$, wherein the silver vanadium oxide is either a β-phase silver vanadium oxide that has in the general formula x=0.35 and y=5.18 or a mixture of a γ-phase silver vanadium oxide that has in the general formula x=0.74 and y=5.37 and the β-phase silver vanadium oxide such that the mixture of the β- and the γ-phases of silver vanadium oxide has in the general formula $0.36 \leq x \leq 0.49$ and $5.19 \leq y \leq 5.25$ and wherein the cell is dischargeable under pulse discharge applications with the β-phase silver vanadium oxide and the mixture of the β- and γ-phases exhibiting decreased voltage delay.

2. The electrochemical cell of claim 1 wherein the silver vanadium oxide is characterized as having been formed from a silver-containing component selected from the group consisting of $AgNO_3$, $AgNO_2$, $Ag_2O$, $Ag_2CO_3$, $Ag(CH_3CO_2)$ and elemental silver.

3. The electrochemical cell of claim 1 wherein the silver vanadium oxide is characterized as having been formed from silver vanadate present in a molar ratio of between about 31% and 39% and vanadium pentoxide present in a molar ratio of between about 61% to 69%.

4. The electrochemical cell of claim 1 wherein the silver vanadium oxide is characterized as having been formed from vanadium pentoxide combined with a silver-containing component in a thermal treatment reaction.

5. The electrochemical cell of claim 4 wherein the silver vanadium oxide is characterized as having been formed during the thermal treatment carried out in an oxidizing atmosphere.

6. The electrochemical cell of claim 4 wherein the silver vanadium oxide is characterized as having been formed during the thermal treatment as a decomposition reaction.

7. The electrochemical cell of claim 4 wherein the silver vanadium oxide is characterized as having been formed during the thermal treatment carried out in an inert atmosphere.

8. The electrochemical cell of claim 4 wherein the silver vanadium oxide is characterized as having been formed during the thermal treatment carried out at a temperature ranging from between about 300° C. to about 700° C.

9. The electrochemical cell of claim 8 wherein the thermal treatment occurs at about 375° C.

10. The electrochemical cell of claim 1 wherein the silver vanadium oxide is characterized as having been formed from vanadium pentoxide and a thermally decomposable salt of silver combined at a temperature of about 375° C.

11. The electrochemical cell of claim 1 wherein the silver vanadium oxide is characterized as having been formed from vanadium pentoxide and a silver-containing component selected from the group consisting of silver vanadate, silver oxide and elemental silver combined in a chemical addition reaction carried out at a temperature ranging from between about 350° C. to about 500° C.

12. The electrochemical cell of claim 1 wherein the cathode component further comprises a conductive additive.

13. The electrochemical cell of claim 12 wherein the conductive additive is selected from the group consisting of carbon and graphite.

14. The electrochemical cell of claim 1 wherein the cathode component further comprises a binder material.

15. The electrochemical cell of claim 14 wherein the binder material is a fluoro-resin polymer.

16. The electrochemical cell of claim 1 wherein the electrolyte comprises a solution of a Group IA metal salt dissolved in a nonaqueous solvent.

17. The electrochemical cell of claim 16 wherein the nonaqueous solvent consists of one of the group selected from an inorganic solvent and an organic solvent.

18. The electrochemical cell of claim 1 wherein the cathode component comprises from between about 80 weight percent to about 99 weight percent of the silver vanadium oxide.

19. The electrochemical cell of claim 1 wherein the cathode component comprises between about 0 to 3 weight percent of a conductive additive, 0 to 3 weight percent of a binder material, and between about 94 to 99 weight percent of the silver vanadium oxide.

20. The electrochemical cell of claim 1 wherein the anode is lithium.

21. An electrochemical cell having a lithium anode which is electrochemically oxidized to form lithium metal ions in the cell upon discharge to generate electron flow in an external electrical circuit connected to the cell, a cathode of electronically conductive material and an ionically conductive electrolytic solution operatively associated with the lithium anode and the cathode, the cathode including a cathode active material comprising silver vanadium oxide having the general formula $Ag_xV_2O_y$, wherein the silver vanadium oxide is either a β-phase silver vanadium oxide that has in the general formula x=0.35 and y=5.18 or a mixture of a γ-phase silver vanadium oxide that has in the general formula x=0.74 and y=5.37 and the β-phase silver vanadium oxide such that the mixture of the β- and γ-phases of silver vanadium oxide has in the general formula $0.36 \leq x \leq 0.49$ and $5.19 \leq y \leq 5.25$ and wherein the cell is dischargeable to generate current pulses in the external electrical circuit while exhibiting decreased voltage delay.

22. The electrochemical cell of claim 21 wherein the silver vanadium oxide is characterized as having been formed from a silver-containing component selected from the group consisting of $AgNO_3$, $AgNO_2$, $Ag_2O$, $Ag_2CO_3$, $Ag(CH_3CO_2)$ and elemental silver.

23. The electrochemical cell of claim 21 wherein the silver vanadium oxide is characterized as having been formed from silver vanadate present in a molar ratio of between about 31% and 39% and vanadium pentoxide present in a molar ratio of between about 61% to 69%.

24. The electrochemical cell of claim 21 wherein the silver vanadium oxide is characterized as having been formed from vanadium pentoxide combined with a silver-containing component in a thermal treatment reaction.

25. The electrochemical cell of claim 24 wherein the silver vanadium oxide is characterized as having been formed during the thermal treatment carried out in an oxidizing atmosphere.

26. The electrochemical cell of claim 24 wherein the silver vanadium oxide is characterized as having been formed during the thermal treatment as a decomposition reaction.

27. The electrochemical cell of claim 24 wherein the silver vanadium oxide is characterized as having been formed during the thermal treatment carried out in an inert atmosphere.

28. The electrochemical cell of claim 24 wherein the silver vanadium oxide is characterized as having been formed during the thermal treatment carried out at a temperature ranging from between about 300° C. to about 700° C.

29. The electrochemical cell of claim 28 wherein the thermal treatment occurs at about 375° C.

30. The electrochemical cell of claim 21 wherein the silver vanadium oxide is characterized as having been formed from vanadium pentoxide and a thermally decomposable salt of silver at a temperature of about 375° C.

31. The electrochemical cell of claim 21 wherein the silver vanadium oxide is characterized as having been formed from vanadium pentoxide and a silver-containing component selected from the groups consisting of silver vanadate, silver oxide and elemental silver combined in a chemical addition reaction carried out at a temperature ranging from between about 350° C. to about 500° C.

32. The electrochemical cell of claim 20 wherein the cathode comprises from about 80 weight percent to about 99 weight percent of the silver vanadium oxide.

33. The electrochemical cell of claim 20 wherein the cathode component comprises between about 0 to 3 weight percent of a conductive additive, 0 to 3 weight percent of a binder material, and between about 94 to 99 weight percent of the silver vanadium oxide.

34. A cathode component for an electrochemical cell, the cathode component including a cathode active material comprising silver vanadium oxide having the general formula $Ag_xV_2O_y$, wherein the silver vanadium oxide is either a β-phase silver vanadium oxide that has in the general formula x=0.35 and y=5.18 or a mixture of a γ-phase silver vanadium oxide that has in the general formula x=0.74 and y=5.37 and the β-phase silver vanadium oxide such that the mixture of the β- and γ-phases of silver vanadium oxide has in the general formula $0.36 \leq x \leq 0.49$ and $5.19 \leq y \leq 5.25$.

35. The cathode component of claim 34 wherein the silver vanadium oxide is characterized as having been formed from a silver-containing component selected from the group consisting of $AgNO_3$, $AgNO_2$, $Ag_2O$, $Ag_2CO_3$, $Ag(CH_3CO_2)$ and elemental silver.

36. The cathode component of claim 34 wherein the silver vanadium oxide is characterized as having been formed from silver vanadate present in a molar ratio of between about 31% and 39% and vanadium pentoxide present in a molar ratio of between about 61% to 69%.

37. The cathode component of claim 34 wherein the silver vanadium oxide is characterized as having been formed from vanadium pentoxide combined with a silver-containing component in a thermal treatment reaction.

38. The cathode component of claim 37 wherein the silver vanadium oxide is characterized as having been formed during the thermal treatment carried out in an oxidizing atmosphere.

39. The cathode component of claim 37 wherein the silver vanadium oxide is characterized as having been formed during the thermal treatment as a decomposition reaction.

40. The cathode component of claim 37 wherein the silver vanadium oxide is characterized as having been formed during the thermal treatment carried out in an inert atmosphere.

41. The cathode component of claim 37 wherein the silver vanadium oxide is characterized as having been formed during the thermal treatment carried out at a temperature ranging from between about 300° C. to about 700° C.

42. The cathode component of claim 41 wherein the thermal treatment occurs at about 375° C.

43. The cathode component of claim 34 wherein the silver vanadium oxide is characterized as having been formed from vanadium pentoxide and a thermally decomposable salt of silver combined at a temperature of about 375° C.

44. The cathode component of claim 34 wherein the silver vanadium oxide is characterized as having been formed from vanadium pentoxide and a silver-containing component selected from the groups consisting of silver vanadate, silver oxide and elemental silver combined in a chemical addition reaction carried out at a temperature ranging from between about 350° C. to about 500° C.

45. The cathode component of claim 34 wherein the cathode component comprises from about 80 weight percent to about 99 weight percent of the silver vanadium oxide.

46. The cathode component of claim 34 wherein the cathode component comprises between about 0 to 3 weight percent of a conductive additive, 0 to 3 weight percent of a binder material, and between about 94 to 99 weight percent of the silver vanadium oxide.

* * * * *